(12) United States Patent
Naheem

(10) Patent No.: US 7,717,387 B2
(45) Date of Patent: May 18, 2010

(54) RAIL HEATER CLIP

(75) Inventor: Sajid Naheem, West Bridgford (GB)

(73) Assignee: Thomas & Betts International, Inc., Wilmington, DE (US)

( * ) Notice: Subject to any disclaimer, the term of this patent is extended or adjusted under 35 U.S.C. 154(b) by 184 days.

(21) Appl. No.: 11/301,537

(22) Filed: Dec. 13, 2005

(65) Prior Publication Data

US 2006/0150563 A1 Jul. 13, 2006

Related U.S. Application Data

(60) Provisional application No. 60/639,396, filed on Dec. 27, 2004.

(51) Int. Cl.
   *A47G 1/00* (2006.01)
   *B60M 5/00* (2006.01)
   *E01B 13/00* (2006.01)
(52) U.S. Cl. ............... 248/316.7; 248/74.2; 248/231.8; 238/14.4; 238/351
(58) Field of Classification Search ............. 248/316.7, 248/74.2, 72, 73, 74.1, 68.1, 65, 229.26, 248/231.8; 52/698, 204.69; 238/14.14, 351, 238/378, 349; 174/138 G, 72 A
See application file for complete search history.

(56) References Cited

U.S. PATENT DOCUMENTS

| | | | | |
|---|---|---|---|---|
| 2,332,855 A | * | 10/1943 | Jones | 248/68.1 |
| 4,826,078 A | * | 5/1989 | Arvin et al. | 238/14.14 |
| 5,127,577 A | * | 7/1992 | Lynch et al. | 248/72 |
| 5,148,981 A | * | 9/1992 | Lynch et al. | 238/351 |
| 5,463,189 A | * | 10/1995 | Deneke et al. | 174/138 G |
| 5,505,436 A | * | 4/1996 | Roick | 267/107 |
| 5,722,509 A | * | 3/1998 | Clinger | 184/3.1 |
| 6,186,799 B1 | * | 2/2001 | Mello | 439/92 |
| 6,334,242 B1 | * | 1/2002 | Scollard et al. | 24/459 |
| 7,090,174 B2 | * | 8/2006 | Korczak et al. | 248/61 |
| 2006/0150563 A1 | * | 7/2006 | Naheem | 52/698 |

OTHER PUBLICATIONS

Steel City, Beams and Purlin, Thomas & Betts, Catalog p. F5, © 2003 Thomas & Betts Corporation.
Steel City, Conduit and Cable Supports, Thomas & Betts, Catalog p. F15, © Thomas & Betts Corporation.

* cited by examiner

*Primary Examiner*—Amy J Sterling
*Assistant Examiner*—Tan Le
(74) *Attorney, Agent, or Firm*—Hoffman & Baron, LLP

(57) ABSTRACT

A rail clip for securing a strip heater to a rail that resists removal when subjected to intense vibration, such as when rail cars are passing overhead. The rail clip is configured with a U-shaped rail flange receiving area wherein the opposite sides of this receiving area are configured with at least one tooth each for securing the rail therebetween. For greater securement, multiple teeth on each side of this U-shaped receiving area would be employed and with at least one tooth on each side thereof being in alignment with the other. Furthermore, the teeth on at least one side of this receiving area would include multiple teeth, both pointed and elongated.

18 Claims, 8 Drawing Sheets

RAIL HEATER CLIP

CROSS-REFERENCE TO RELATED APPLICATIONS

This application claims priority to U.S. Provisional Application No. 60/639,396, filed Dec. 27, 2004.

FIELD OF THE INVENTION

This invention pertains to a bracket for securing rail heater clips, heating cable and associated equipment to a fixed or moving rail line. These rail heater clips are specifically designed to resist removal when subjected to intense vibration or other irregular loading, such as when rail cars are passing overhead.

BACKGROUND OF THE INVENTION

Rail heater clips are used to secure a strip heater, a heat sensor or other items to a rail line (such as a commuter or freight rail). In colder climates, portions of rail lines need to be heated to prevent them from freezing. This is especially important at rail switch points or wherever the rail is to be shifted or moved. Strip heaters and other items are used at these locations to prevent snow or ice from blocking or otherwise restricting any such rail movement.

Rail heater clips have existed for quite some time and they come in many different variations depending on the size and/or shape of the rail as well as the item they are to secure to the rail. Rail heater clips also vary depending on the part of the rail the heat is to be applied to.

Perhaps the biggest challenge facing these clips is the need to remain attached to the rail during times of intense vibration, such as when rail cars are moving directly overhead. This requirement along with avoiding mechanical breakage and deterioration are paramount in designing and manufacturing rail heater clips.

At the same time, ease of installation is an important consideration. If the installation is complicated or requires special equipment, there is a greater chance that the installation will be faulty. Hence, welding or gluing clips in place are less viable alternatives since both require pre-preparation to adhere properly. Furthermore, the employment of magnetic properties to secure the clip to the rail will not suffice since such magnetic properties will be adversely affected by the electro magnetic fields generated by the passing cars. The current method was seen to be the most viable for production at this point in time. However, it may transpire that at some later stage with advances in cleaning technology or capabilities to overcome electro-magnetic effects that these other methods of installation will become more viable for manufacture.

Thus it is an object of this invention to develop a rail heater clip that is not only easy to install, but which will also resist vibration loading. Another object of this invention is to develop a rail heater clip that can accommodate a variety of different rail strip heaters and associated equipment as well as secure such items in place upon the rail. Yet another object of this invention is to provide a rail heater clip whose gripping capability is not diminished or affected whether the heating equipment is to be secured to the side or to the bottom of the rail. Still another object of this invention is to provide a rail heater clip that can be altered to accommodate any variety of differently sized and/or shaped rails. Another feature is to provide a rail heater clip that provides a more balanced grip upon the rail and one that is specially configured to resist removal. These and other objects and advantages of this invention will be come apparent upon further investigation.

SUMMARY OF THE INVENTION

This invention pertains to a rail clip for securing a strip heater or other associated equipment to a rail. It consists of a clip having a rail flange receiving area for securing the clip to the rail and a strip heater receiving area for securing a strip heater against the rail. The flange receiving area is generally U-shaped in configuration and has opposing teeth. The opposing teeth consist of a plurality of teeth on one side surface of the U-shaped configuration and at least one tooth on an opposite side surface of the U-shaped configuration.

DETAILED DESCRIPTION OF THE PREFERRED EMBODIMENT

Figure 1:
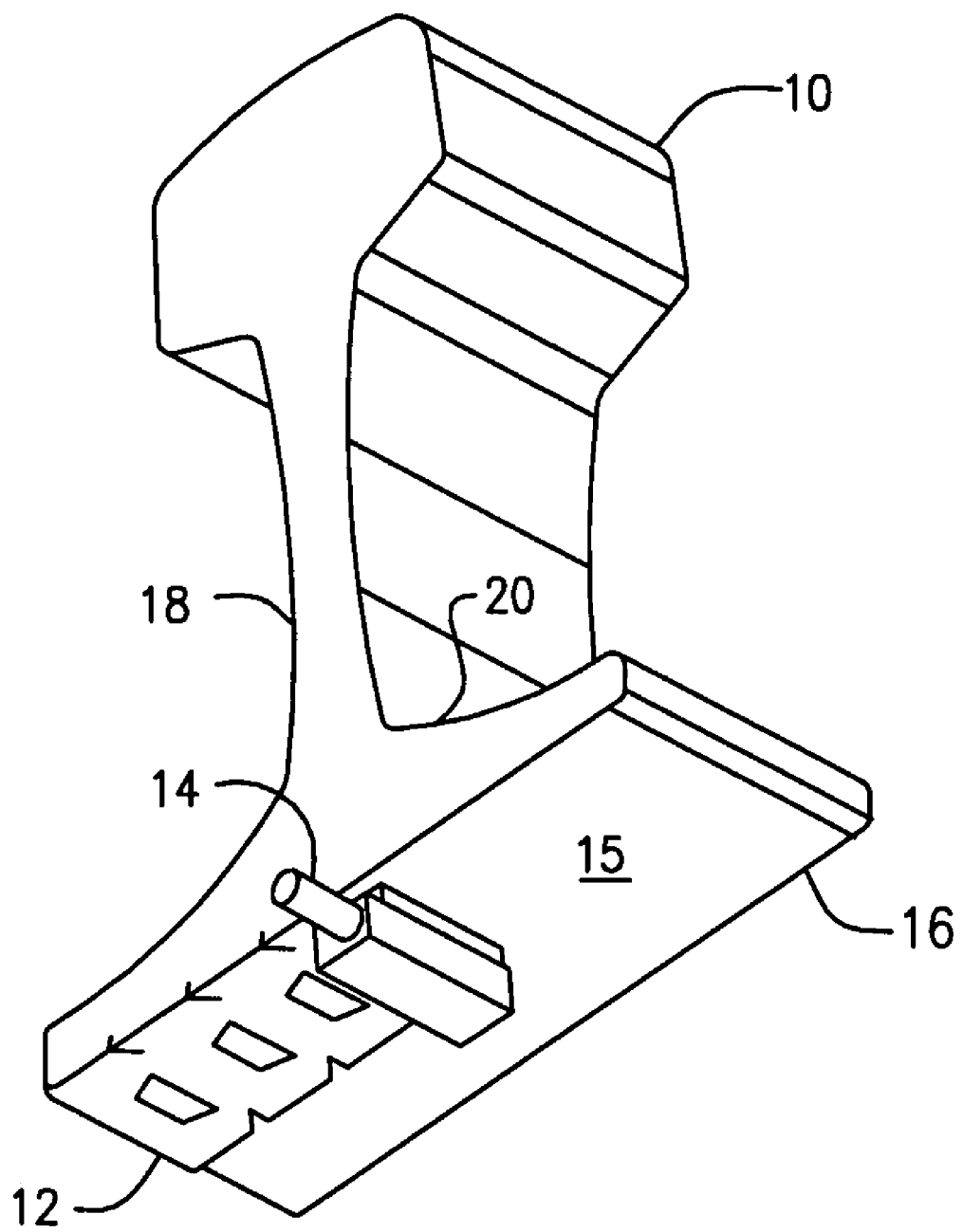
FIG. 1 is a pictorial view of a first embodiment of the invention shown with a heat sensor installed on the underneath side of the rail.
Figure 2:
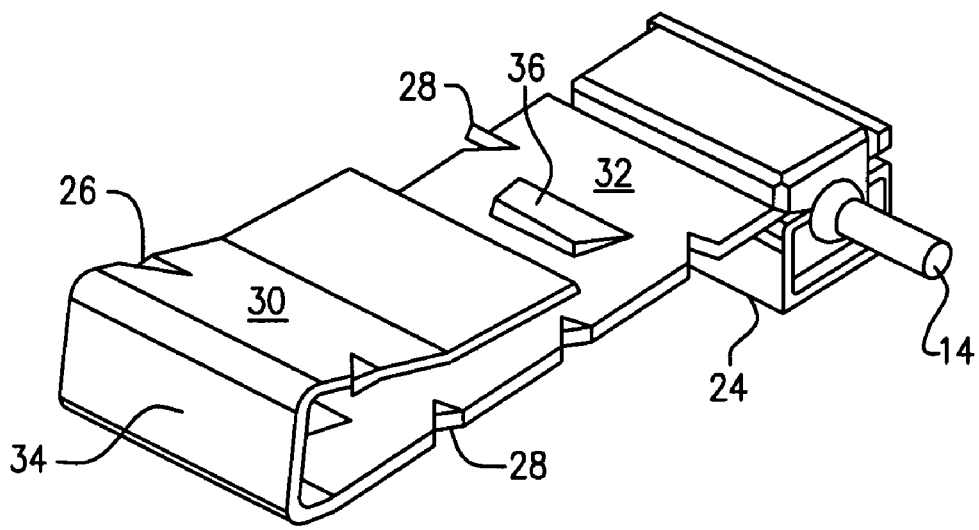
FIG. 2 is a perspective view of the first embodiment of FIG. 1 in its pre-installed state.
Figure 3:
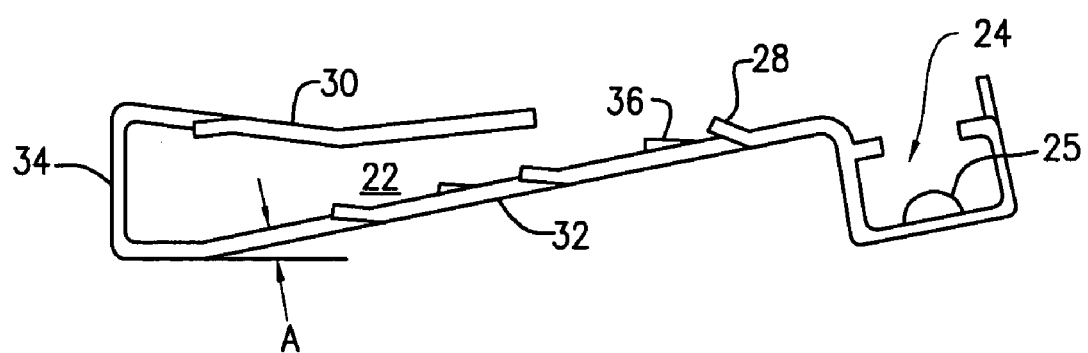
FIG. 3 is a side view of the first embodiment of the invention shown in FIGS. 1 and 2.

Referring to the drawings, there is shown rail clips of various configurations to accommodate various rail 10 configurations. Rail 10 comes in many different sizes and shapes and hence the need for many different configurations for rail clips. FIGS. 1-3 show the first embodiment of the present invention. Rail clip 12 is shown securing strip heater 14 against a bottom surface 15 of lower flange 16 of rail 10. Other figures show different versions of rail clips of the present invention which secure either a strip heater, a temperature sensor 14 or other cabling accessory against a side surface or web 18 of rail 10. Other rail clips of the present invention are designed to secure product against an upper surface 20 of flange 16 of rail 10. A strip heater 14 is oftentimes held against the bottom of rail 10 and operates to detect the temperature of rail 10 to thereby provide feedback to the control system so that when strip heater 14 gets to a pre-determined temperature, heat is delivered to rail 10 via strip heater 14 secured in place via clip 12. For purposes of clarification, the term 'strip heater' will encompass the strip heater and any associated sensor, a temperature sensor or cabling component.

Rail clip 12 is generally constructed of thin planar material, preferably metal, that is bent into a particular configuration depending on the shape of rail 10 to which clip 12 will attach. The thickness of this planar material may be varied depending on the force or bias to be applied by clip 12 upon rail 10; the thicker the material (i.e. the harder to spread open clip 12) the more bias is applied by clip 12 upon rail 10. Rail clip 12 is bent so as to have both a flange receiving area 22 and a strip heater receiving area 24. Generally, both of these areas 22 and 24 are 'U' shaped (but not always) so that both flange 16 and strip heater 14 can be properly secured therein. Strip heater receiving area 24 is preferably configured so that maximum heat transfer between strip heater 14 and rail 10 can be accomplished.

FIGS. 2 and 3 show the flange receiving area 22 defined by opposing sides or legs 30 and 32. Legs 30 and 32 have upper teeth 26 and lower teeth 28, respectively. Ideally teeth 26 and 28 come in pairs on their respective sides 30 and 32 and preferably each of these teeth 26 and 28 are found in or near the outer edge region of their respective sides 30 and 32. Teeth 26 and 28 are also shown in these embodiments as coming to a point so as to better engage rail 10. They are also shown as being angled or configured with respect to their respective sides 30 and 32 such that teeth 26 and 28 resist the removal of clip 12 from rail 10. This is accomplished by having teeth 26 and 28 inclined both into flange receiving area 22 and also towards member 34 that joins sides 30 and 32. One common method of constructing teeth 26 and 28 is to make them of the same material as rail clip 12, such as by punching.

It should also be noted that preferably at least one or more upper teeth 26 are located opposite or generally immediately above a corresponding one or more lower teeth 28. In this fashion, at least for the bias applied by these teeth to flange 16, the bias applied is somewhat symmetrical or balanced so that the 'pinching' forces applied by these teeth 26, 28 are preferably aligned with each other and are not greatly offset from each other. Teeth 26 and 28 are preferably positioned so as to provide a balanced grip upon flange 16 employing much the same mechanics as occurs when a human hand grips an object. Such alignment (or force cancellation) reduces or eliminates any imbalance between these opposing forces which thus curtails or prevents such imbalance from playing any part in any attempted dislodgment of clip 12 from rail 10.

Located between lower teeth 28 on side 32 are additional elongated teeth 36. These elongated teeth 36 are also configured and angled much like teeth 28 in order to resist the removal of clip 12 from rail 10 once clip 12 is installed around flange 16. In the embodiments shown, the longitudinal nature of elongated teeth 36 provide additional and increased contact surface with rail 10. This too aids in resisting the removal of clip 12 from flange 16 during periods of intense vibration. Ideally there would be three such elongated teeth 36 configured in side 32 with these three teeth 36 being somewhat evenly spaced from each other so as to better distribute their gripping capability along the full length of side 32.

Strip heater receiving area 24 is, as previously indicated, generally U-shaped, but a review of the preferred embodiments shows that this is not always the case. The actual configuration of strip heater receiving area 24 will vary greatly depending on both the shape of the strip heater 14 and the portion of the rail 10 that is to be in contact with strip heater 14. In some instances, strip heater receiving area 24 is to support or secure a cable, wire, pipe or conduit that is spaced slightly from rail 10 so that there is no direct contact between such strip heater 14 and rail 10 (such contact instead extending through clip 12). FIG. 3 shows strip heater receiving area including a protrusion 25 on the base of the U-shape to raise the strip heater 14 so there is less contact between the clip 12 and the surface of the sensor 14.

When possible, it is desirable for strip heater receiving area 24 to be positioned opposite one or more sets of lower teeth 28 (or even elongated teeth 36). Thus, the bias applied by such strip heater 14 will be balanced with the bias applied by these teeth in side 32 in order to achieve the same advantages as discussed above with respect to the alignment and gripping characteristics of upper and lower teeth 26 and 28.

Furthermore, when possible, strip heater receiving area 24, as well as flange receiving area 22, is to be configured so as to closely conform to the shape of rail 10 to which clip 12 is applied. This is desirable not only so that the forces applied by clip 12 upon rail 10 are as balanced as possible, but so that during periods of intense vibration, each of teeth 26, 28 and 36 may come to bear upon rail 10 as described below in order to resist any movement of clip 12 away from rail 10 to the fullest extent possible. The teeth provide a set of pressure points which resist sliding. The force of the pressure points is generated by the spring in the material and shape of the rail clips 12.

In many rail 10 configurations, bottom surface 15 of rail 10 is flat. Thus, corresponding side 32 of rail clip 12 needs to be generally flat and parallel after installation so that all its teeth 28 and 36 will fully engage this bottom surface 15 as intended. However, manufacturing tolerances of both rail 10 and clip 12 will vary slightly such that in reality, some of teeth 28 and/or 36 may be levered away from any such contact (i.e. one or more teeth 28/36 acting as a fulcrum). Additionally, in many other rail 10 configurations, bottom surface 15 is bowed or concave inwardly. This further compounds the difficulty of generating proper contact of side 32 with bottom surface 15.

Thus, the embodiments of this invention is the purposeful configuration of side 32 so that it is not perpendicular to joining member 34 as would normally be expected. Instead, side 32 is actually bent so as to be angled or inclined towards or into flange receiving area 22. Side 32 is inclined at an angle A between about 4 degrees to about 13 degrees, more preferably between about 10 degrees and 12 degrees. Thus, not only does this overcome any possible leveraging that may arise from flat bottom surface rails, but such inclination also permits clip 12 to fully engage the bottom surface of bowed or concave flanges 16.

In the embodiments shown, lower side 32 is configured with six individual teeth 28 (or three pairs of teeth 28) along with three elongated teeth 36. These nine teeth spread the lower gripping forces of clip 12 against bottom surface 15 over a much larger area than occurs with existing rail clips 12. Hence, the point forces upon rail 10 are less than before due to these forces being spread over a larger area. Thus, less disfiguration of rail 10 occurs.

These nine teeth 28/36 along with at least two aligned teeth 26 in upper side 30 provide an ideal balance of gripping strength, vibration resistance, low weight, cost reduction and manufacturing efficiency. The preferred installation manner is to be simply hammered onto flange 16 without any further drilling, welding, gluing, etc., thus ease of installation is also achieved via this new clip design.

During freestanding conditions (i.e. when clip 12 is not experiencing any vibration due to passing rail cars), the greatest pressure point occurs between strip heater contact points and elongated teeth 36 on lower side 32. Thus, during such freestanding conditions, pointed teeth 26 and 28 will be under little loading. However, during periods of intense vibration (such as when rail cars are passing overhead), then clip removal is resisted via pointed teeth 26 and 28 and not so much as by elongated teeth 36 and strip heater contact points. These pointed teeth 26 and 28 act as wedges preventing movement with respect to top and bottom surfaces 15 and 20 of flange 16. Pointed teeth 26 and 28 effectively cancel out the effects of any applied vibration force.

The first teeth to see any force will be teeth 28 opposite strip heater 14 when clip 12 is initially hammered or knocked onto flange 16. These and subsequent pointed teeth 28 will subsequently 'give' ever so slightly upon continued installation because of their reverse angle and small (point) contact area. In equilibrium then, the greater pressure applied upon rail 10 will be via elongated teeth 36. At this stage, the contact surfaces of teeth 28 and 36 will be at the same level. However, when reverse forces due to vibration are applied to clip 12, then it is the pointed contact surfaces of teeth 28 that offer the greatest resistance (pressure over area) to withdrawal. Teeth 28 effectively stops or prevents clip 12 from sliding or vibrating off rail 10 because any such attempt simply forces pointed teeth 28 further into engagement with rail surface 15.

The same can be said of upper teeth 26 as well. During equilibrium, clip 12 is retained in place upon rail 10 via strip heater 14, but during periods of vibration, the contact points of teeth 26 act as a wedge to negate any backward sliding of clip 12 from rail 10.

As stated earlier, the forces applied by rail clip 12 can be varied by changing the thickness of its material. Also, due to clip 12 being located in rather extreme locations under harsh environmental conditions, it is preferable to provide a protective coating to such clips so as to prolong their mechanical characteristics and prevent its deterioration. Such a coating may include a zinc compound as a sacrificial layer that will help maintain the integrity of the underlying material.

Figure 4:
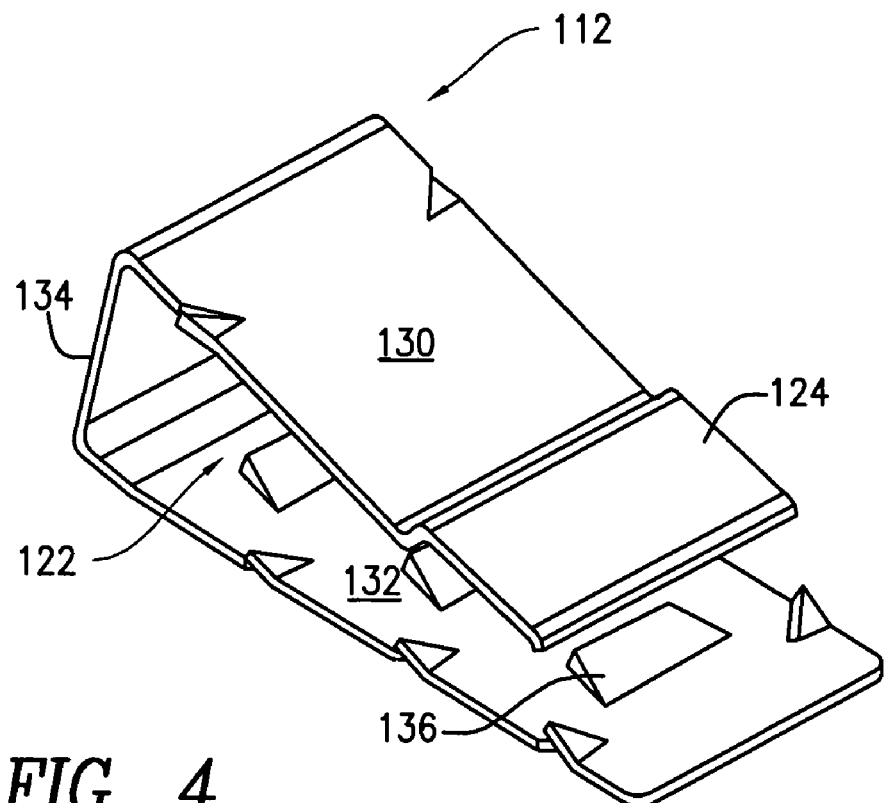
FIG. 4 is a perspective view of a second embodiment of the invention.
Figure 5:
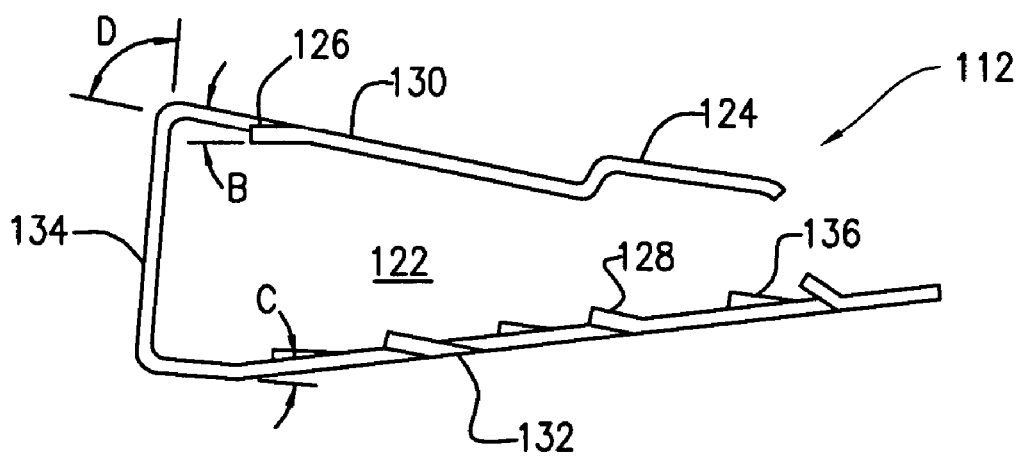
FIG. 5 is a side view of the second embodiment of the invention shown in FIG. 4.
Figure 6:
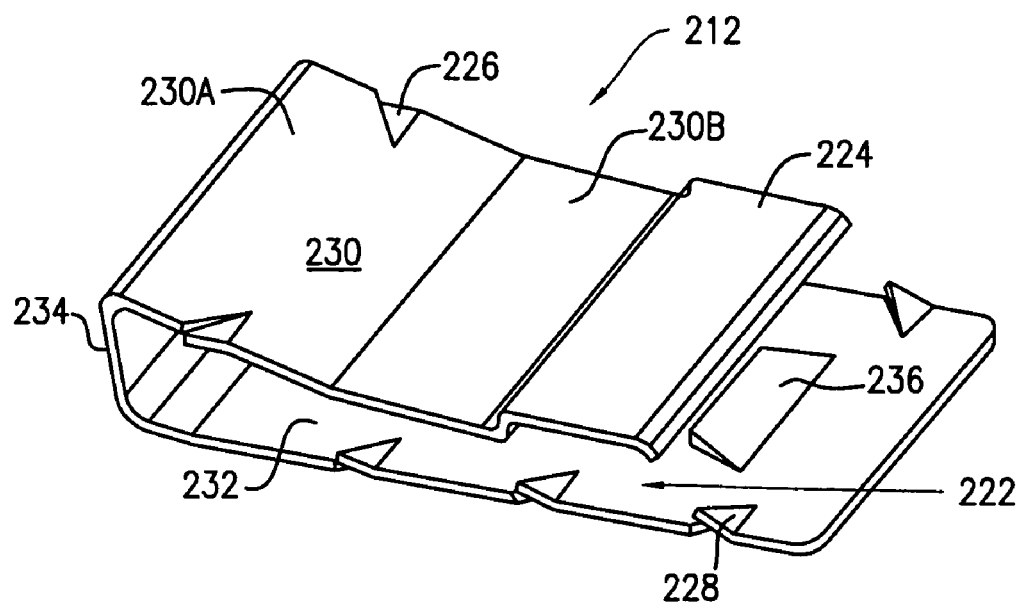
FIG. 6 is a perspective view of a third embodiment of the invention.

FIGS. 4, 5 and 6 show a foot mount rail clip 112 and 212 which is similar to rail clip 12 of FIGS. 1-3. Foot mount rail clip 112 of FIGS. 4 and 5 is generally "U-shaped" with ends pinched inwardly defining flange receiving area 122. Specifically, the flange receiving area 122 is defined by upper side 130, lower side 132 and interconnecting side 134 therebetween. Upper side 130 includes teeth 126 projecting inwardly toward flange receiving area 122. The teeth 126 project inwardly at an angle B which is between about 8 and 12 degrees from the upper surface 130. Teeth 128 and 136 project from the lower side 132 toward the flange receiving area 122. Teeth 126, 128, 136 are of similar function and configuration as teeth 26, 28, 36 of FIG. 3, respectively.

FIG. 5 shows angle C, which is defined by the perpendicular plane of side 134 to the angle of inwardly bend of side 132, is similar to angle A of FIG. 3. Angle C is between about 4 to about 13 degrees, more preferably between about 10 degrees to about 12 degrees. The angled configuration provides securement of the rail clip 112 to the rail, as previously discussed with reference to rail clip 12 of FIG. 3. Similarly, FIG. 5 shows angle D which is defined as the inward angle of the bend of side 130 from side 134. Angle D ranges between about 78 degrees to about 85 degrees. FIGS. 4 and 5 further show the strip heater receiving area 124 which is attached to the upper side 130 and extends therefrom. The heat receiving area 124 is generally planar with slightly inwardly angled ends. The heat receiving area 124 is elevated slightly above the plane of side 130 to provide for a space for the strip heater to run therethrough.

The heat receiving area 124 of FIG. 5 is located on a different part of the rail clip 112 then heat receiving area 24 of FIG. 1. Rail clip 112 of FIG. 5 provides for heat receiving area 124 depending from the upper side 130. The heat receiving area 124 secures a strip heater 14 to the upper surface 20 of the rail 10.

FIG. 6 shows foot mount rail clip 212 which is similar to the foot mount rail clip 112 of FIGS. 4 and 5. Rail clip 212 includes a flange receiving area 222 which is defined by lower side 232, upper side 230 and side 234 therebetween. Upper side 230 and lower side 232 are similarly angled inwardly as discussed in reference to rail clip 112 of FIG. 5. Rail clip 212 includes teeth 226, 228 and 236 which are similar in geometry and function as teeth 26, 28 and 36 of FIGS. 1-3. Further, rail clip 212 has a strip heat receiving area 224 similar to the strip heat receiving area 124 of FIG. 5 in that it depends from the upper side 130. The heat receiving area 224 is elevated slightly above the plane of side 230 to provide for a space for the strip heater to run therethrough, between the rail clip 212 and the upper surface 20 of the rail clip 10.

One difference between foot mount rail clip 112 of FIG. 5 and foot mount rail clip 212 of FIG. 6 is that upper side 230 includes an angled portion 230A and planar portion 230B. The two-tiered geometry provides for additional securement and a frictional surface contact of planar portion 230B to rail 10. Further, foot mount rail clip 212 has a smaller U-bend. Specifically, the height of side 234 is shorter then the height of side 134 of FIGS. 4 and 5 to accommodate a smaller rail configuration.

Figure 7:
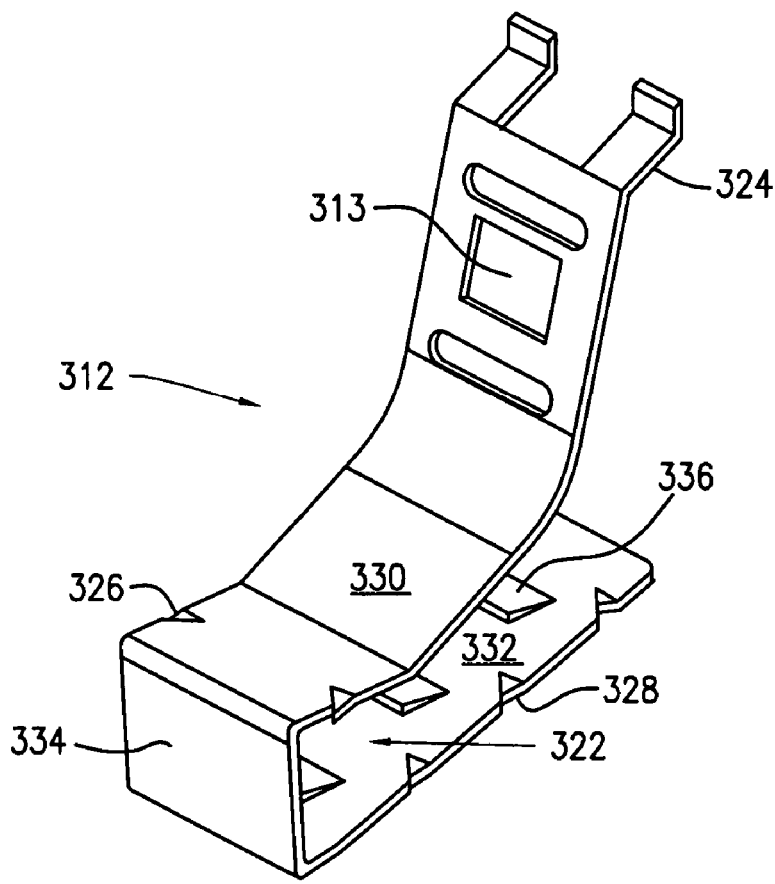
FIG. 7 is a perspective view of a fourth embodiment of the invention.
Figure 8:
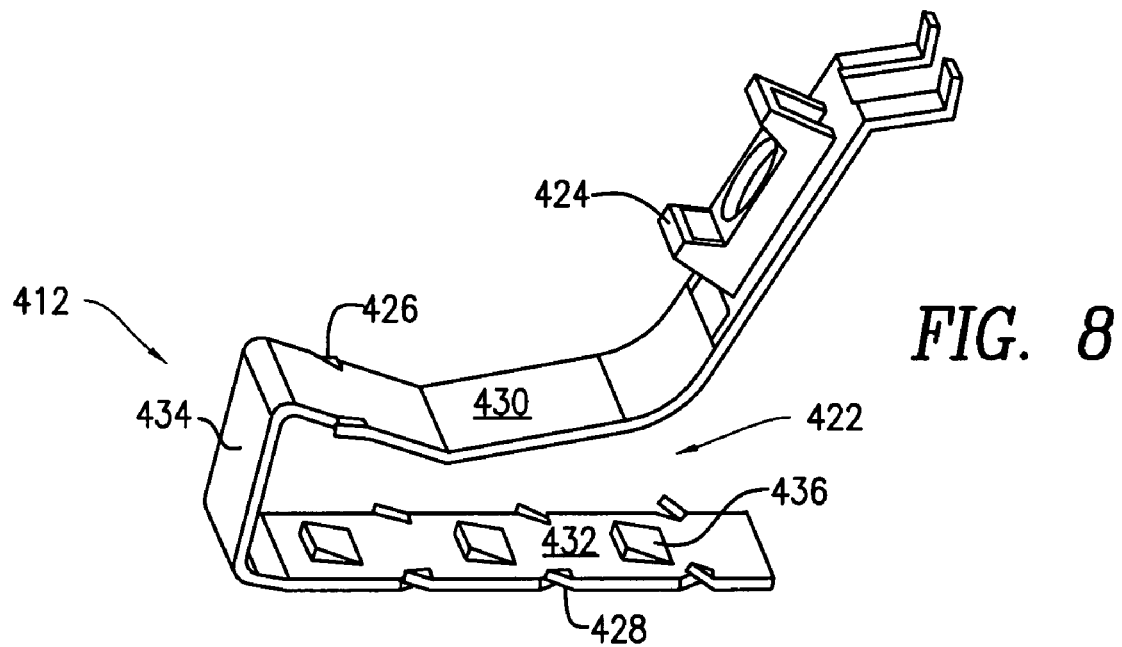
FIG. 8 is a perspective view of a fifth embodiment of the invention.
Figure 9:
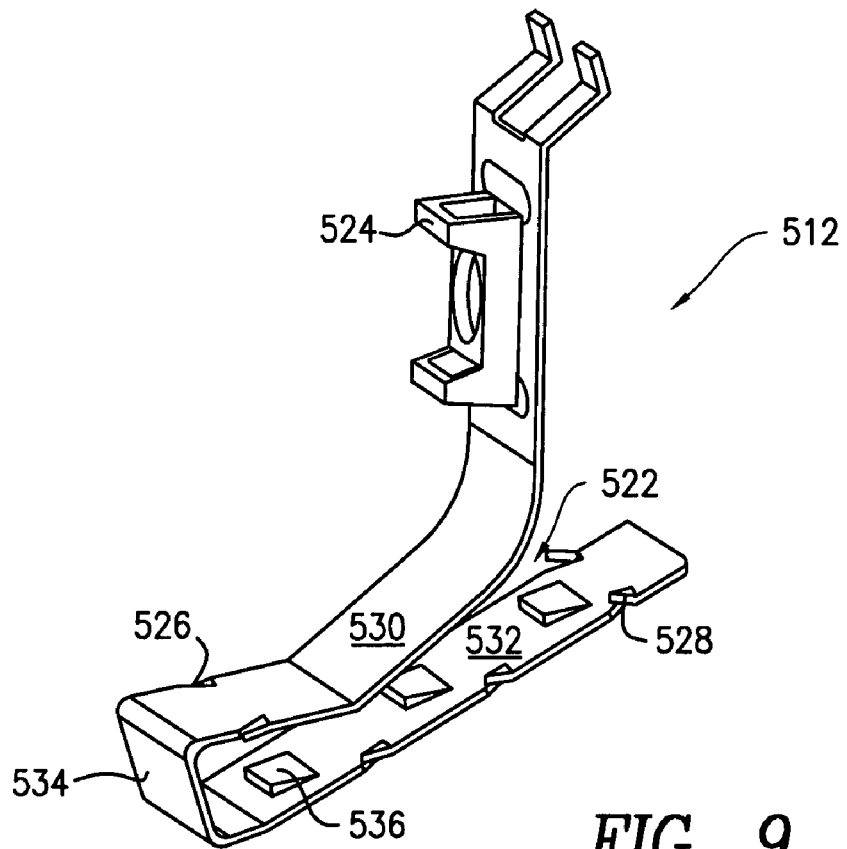
FIG. 9 is a perspective view of a sixth embodiment of the invention.

Further embodiments of the present invention are shown in FIGS. 7, 8 and 9. The rail clips 312, 412 and 512 are similar to rail clip 12 of FIGS. 1-3 but they have the heat receiving area 324, 424 and 524 depending from upper side 330, 430 and 530, respectively, instead of the lower side as in rail clip 12 shown in FIG. 1-3. The rail clips 312, 412 and 512 include lower sides 332, 432 and 532; side 334, 434 and 534; and upper side 330, 430 and 530 which define flange receiving areas 322, 422, 522, respectively. Further, teeth 328, 428, 528 and 336, 436, 536 on lower sides 332, 432 and 532, respectively, are similar to the teeth above-described in the other embodiments. The upper side 330, 430 and 530 also includes teeth 326, 426 and 526 which are similar to teeth 26 of FIGS. 1-3. The geometry of flange receiving area 322, 422 and 522 of FIGS. 7, 8 and 9 differ slightly. For example, rail clip 512 of FIG. 9 includes side 534 which is shorter in height then side 334 and 434 of FIGS. 7 and 8. Additionally, the flange receiving area 522 of FIG. 9 is smaller then the flange receiving area 322 and 422 of FIGS. 7 and 8 to accommodate a smaller rail. A further difference is the geometry of the heat receiving area 324, 424 and 524 which provide for different sensor attachment thereto. For example, rail clip 312 of FIG. 7 includes a square cut out 313 to accept an ECS type of clip for wire suspension and cable management. FIGS. 8 and 9 do not include a square cutout instead they have a circular opening about 5 mm. to about 7 mm. in diameter and an attachment mechanism for allowing a cable tie block to be riveted thereto.

Figure 10:
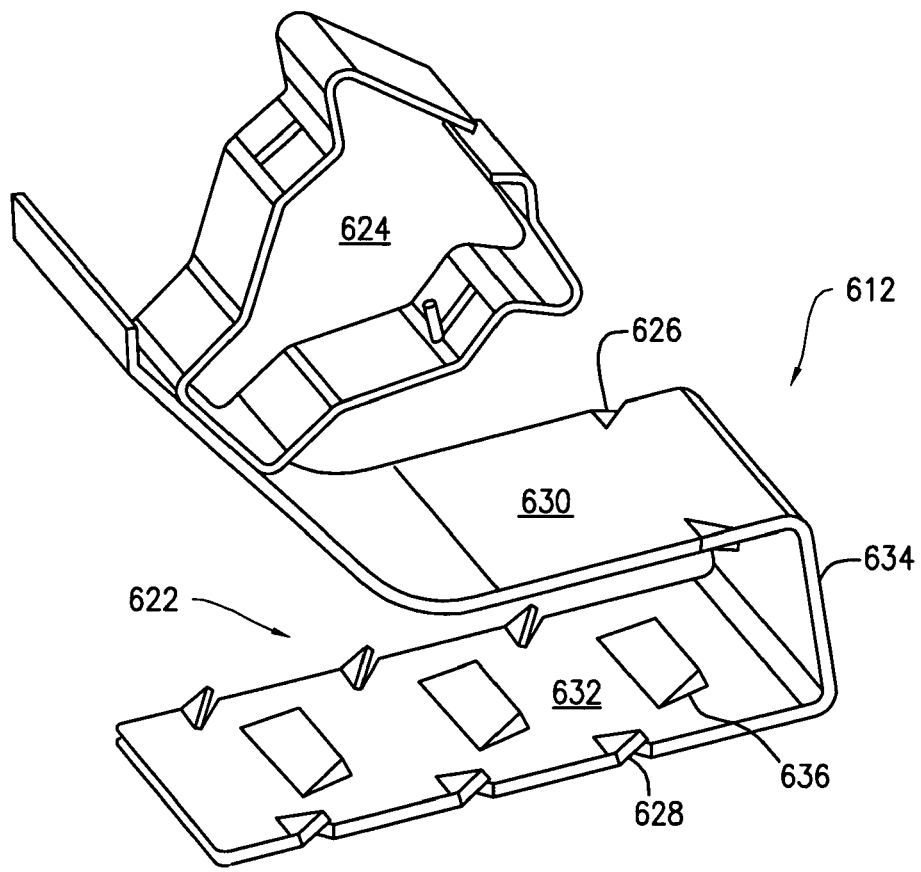
FIG. 10 is a perspective view of a seventh embodiment of the invention.
Figure 11:
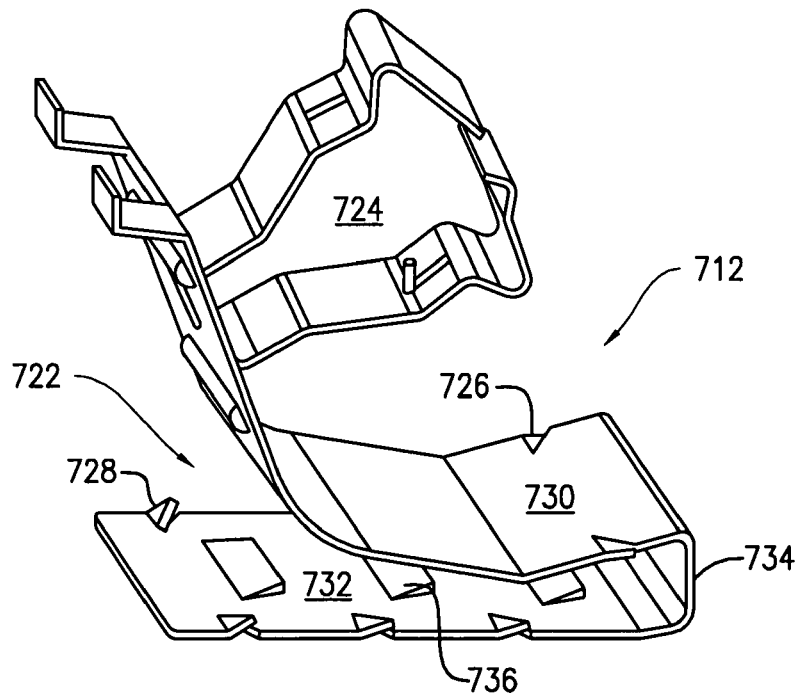
FIG. 11 is a perspective view of a eighth embodiment of the invention.
Figure 12:
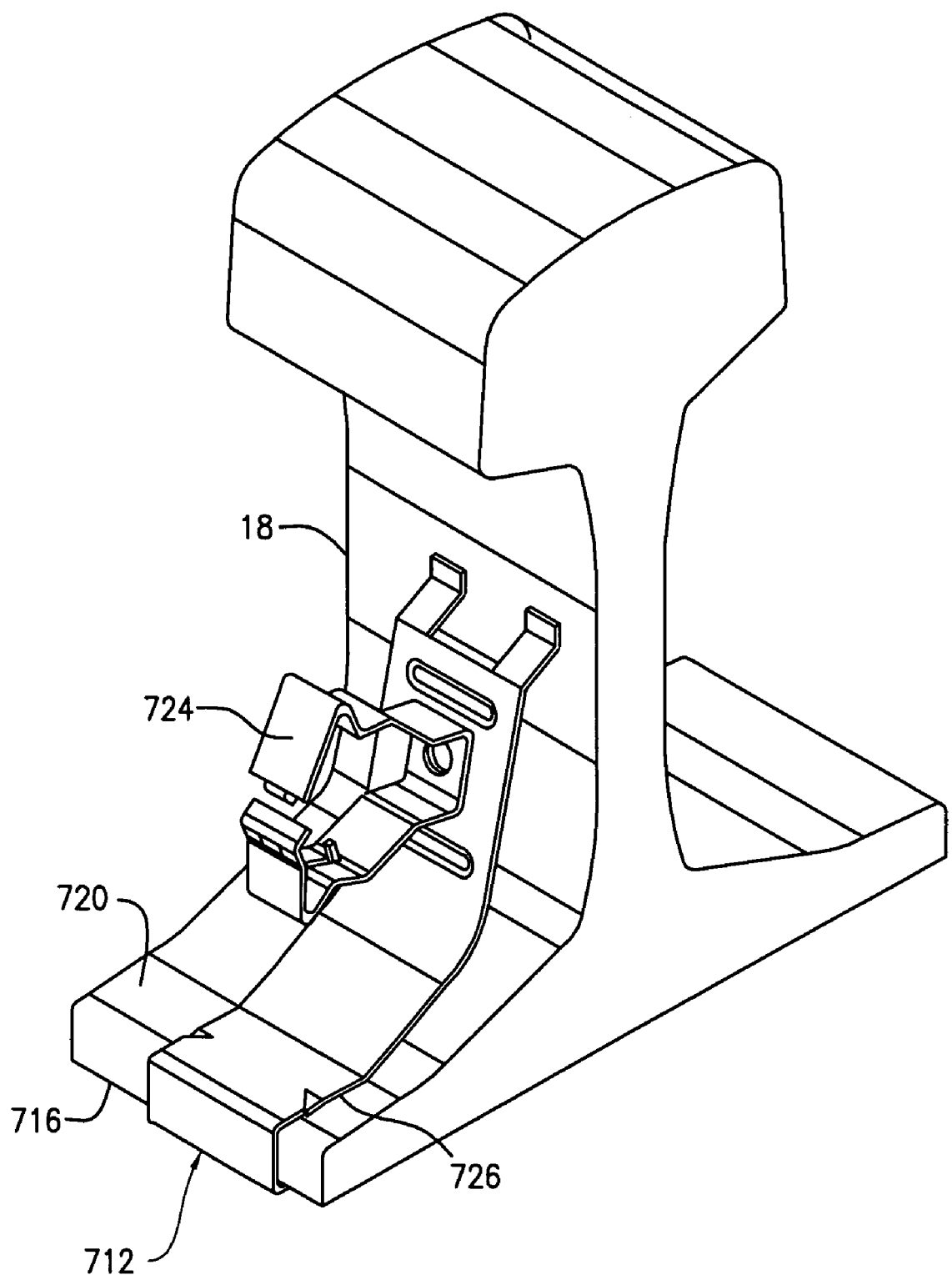
FIG. 12 is a perspective view of the embodiment of FIG. 11 shown secured to a rail.

FIGS. 10, 11 and 12 show, further embodiments of the present invention, rail clips 612 and 712. Rail clips 612 and 712 are similar to rail clip 412 of FIG. 8 because the heat receiving areas are similarly located on the upper side of the clip. However, the geometry of the heat receiving areas 624 and 724 differ from heat receiving area 424 of FIG. 8 to accommodate different attachments, heat sensors or heat strips 14 thereto. The heat receiving area 624 and 724 is defined by an upper jaw and a lower jaw which are attached at one end to the upper side 630 and 730 and extend outwardly therefrom. The other unattached end of the upper jaw and lower jaw are curved towards each other to partially enclose the heat receiving area 624 and 724. A heat element slidable enters between the two jaws at the unattached ends into the heat receiving area 724.

FIGS. 10 and 11 show rail clips 612 and 712 which include lower sides 632 and 732; side 634 and 734; and upper side 630 and 730 defining flange receiving areas 622 and 722, respectively. Further, teeth 628 and 728, and 636 and 736 on lower sides 632 and 732 are similar to teeth 28 and 36 of FIGS. 1-3. The upper side 630 and 730 also includes teeth 626 and 726 which are similar to teeth 26 of FIGS. 1-3. The geometry of flange receiving area 622 and 722 of FIGS. 10 and 11 differ slightly. Rail clip 712 of FIG. 11 includes side 734 which is shorter in height then side 634 of FIG. 10. Additionally, the upper side 730 in angled inwardly toward the lower side 732 creating a flange receiving area 722 with smaller area then flange receiving area 622 of FIG. 10.

FIG. 12 shows rail clip 712 attached to a rail 18. The rail clip 712 is mounted on the rail 18 such that the upper side 730 is frictionally engaged with surface 20 of the rail 18. Teeth 726 are shown engaged with surface 20 to secure rail clip 712 thereto. Further shown is the heat receiving area 724 protruding from the upper side 730 of the rail clip 712 and the rail 18.

Figure 13:
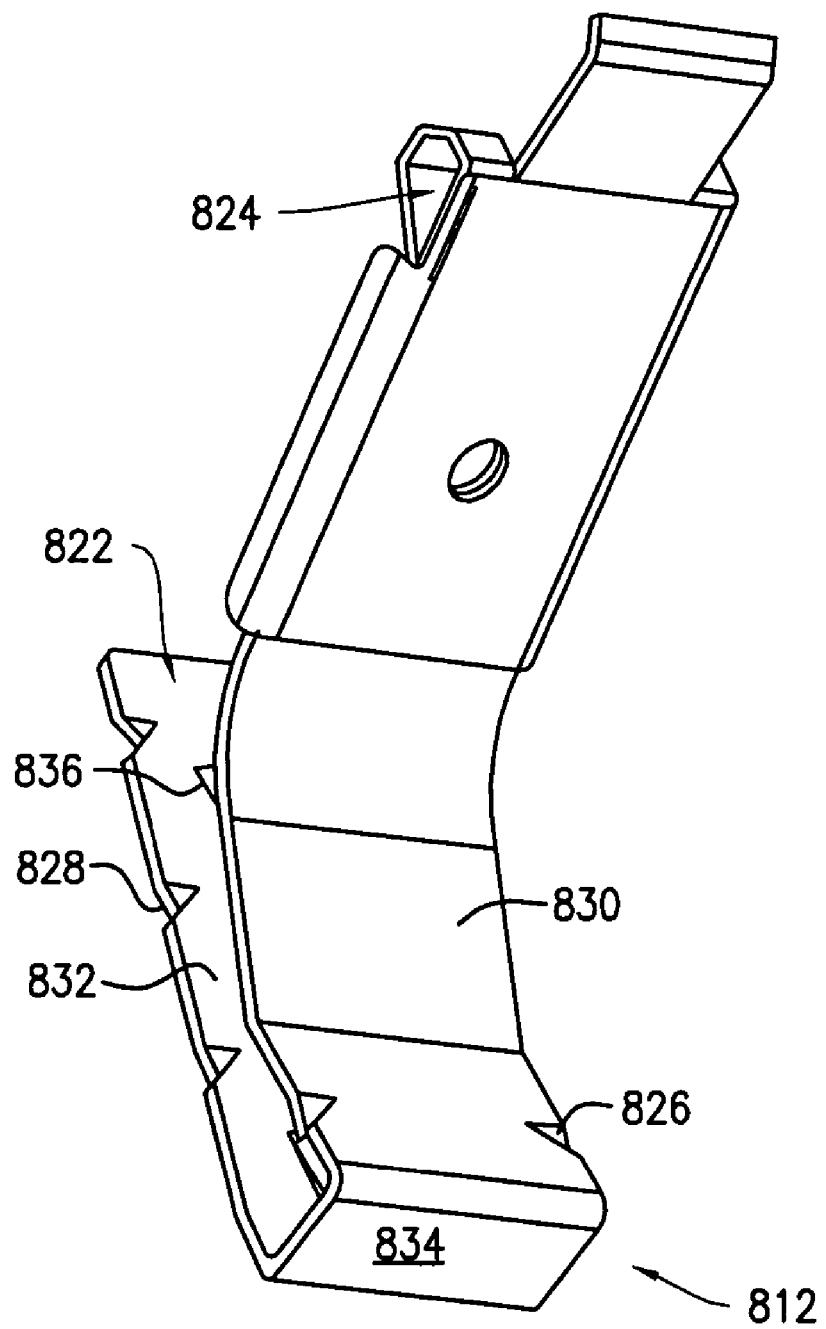
FIG. 13 is a perspective view of a ninth embodiment of the invention.

Another embodiment of the present invention is rail clip 812 shown in FIG. 13. Rail clip 812 is similar the previous described rail clips. Rail clip 812 includes lower side 832, side 834, and upper side 830 which defines flange receiving area 822. Further, teeth 828 and 836 on lower side 832 are similar to the teeth above-described in the other embodiments. The upper side 830 also includes teeth 826 which are similar to teeth 26 of FIGS. 1-3. The geometry of flange receiving area 822 is different from the previous described flange receiving areas of the other embodiments to accommodate a different variety of attachments or heat strips 14. The flange receiving area 824 includes a planar section mounted on the upper portion of the upper side 830. The planar portion includes a centrally located circular hole therethrough. The planar portion further includes a pair of rear facing loops to accommodate wires therethough.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A rail clip for securing a strip heater to a rail comprising:
   a clip having a rail flange receiving area for securing the clip to the rail, a strip heater receiving area for securing a strip heater against the rail, an elongated lower side extending between said rail flange receiving area and said strip heater receiving area;
   said strip heater receiving area extending from said lower side to an unattached end of said strip heater receiving area; and
   said flange receiving area is defined by an unattached end of said flange receiving area, an upper side extending from said unattached end of said receiving area to a joining member, and said joining member extending between said upper side and said lower side, said upper side is shorter in length than said lower side, said lower side extending from said joining member to said strip heater receiving area, said flange receiving area being generally U-shaped in configuration with said lower side and said unattached end of said flange receiving area angling inwardly toward each other to reduce the flange receiving area said flange receiving area includes opposing teeth, said opposing teeth comprising a plurality of teeth on said lower side and at least one tooth on said upper side.

2. The rail clip as set forth in claim 1 wherein said opposing teeth comprising a combination of both pointed and elongated teeth projections.

3. The rail clip as set forth in claim 2 wherein said lower side contains at least one pointed tooth and at least one elongated tooth and wherein said upper side contains at least one pointed tooth.

4. The rail clip as set forth in claim 3 wherein said lower side and said upper side each contain a plurality of teeth therein and with at least one said tooth on said lower side and said upper side surface being configured to engage the rail upon clip withdrawal.

5. The rail clip as set forth in claim 1 wherein at least one tooth on said lower side is aligned with another said tooth on said upper side.

6. The rail clip as set forth in claim 3 wherein said pointed teeth on said lower side and said upper side are aligned with each other.

7. The rail clip as set forth in claim 1 wherein said lower side is non-parallel with said upper side.

8. The rail clip as set forth in claim 7 wherein said non-parallel lower side is inclined inwardly at an angle of between about 10 degrees to about 12 degrees with respect to said upper side.

9. The rail clip as set forth in claim 1 wherein said heater receiving area is attached via material continuity to said one side surface.

10. The rail clip as set forth in claim 1 wherein said heater receiving area having two opposing sides and a base.

11. The rail clip as set forth in claim 1 wherein said strip heater receiving area is adapted to be secured against a bottom surface of a lower flange of a rail.

12. The rail clip as set forth in claim 1 wherein said clip is formed from a planar material, said planar material is bent to form said a rail flange receiving area and a strip heater receiving area.

13. The rail clip as set forth in claim 12 wherein said planar material extends between said unattached end of said flange receiving area and said unattached end of said heater receiving area.

14. A rail clip for securing a strip heater to a rail comprising:
   (a) a clip having a rail flange receiving area and a strip heater receiving area for securing a strip heater against the bottom of the rail, said rail flange receiving area and said strip heater receiving area are positioned at opposite ends of said clip;
   (b) both said flange receiving area and said strip heater receiving area being configured to closely follow the contour of the rail;
   (c) said flange receiving area being generally U-shaped in configuration and having opposing teeth;
   (d) said opposing teeth comprising a combination of pointed and elongated teeth projections;
   (e) said pointed and elongated teeth projections comprising a plurality of teeth on one side surface of said U-shaped configuration and at least one tooth on an opposite side surface of said U-shaped configuration; and
   (f) said one side surface having two outer edges and an inner surface there between, wherein said elongated teeth being located on the inner surface.

15. The rail clip as set forth in claim 14 wherein said one side surface contains at least one pointed tooth and at least one elongated tooth and wherein said opposite side surface contains at least one pointed tooth located opposite of and in alignment with one of said teeth in said one side surface.

16. The rail clip as set forth in claim 15 wherein said one side surface is non-parallel with said opposite side surface.

17. The rail clip as set forth in claim 14 wherein said non-parallel one side surface is inclined at an angle of between about 10 degrees to about 12 degrees with respect to said other side surface.

18. A rail clip for securing a strip heater to a rail comprising:
   a clip including a rail flange receiving area and a strip heater receiving area for securing a strip heater against a bottom surface of the rail, said rail flange receiving area and said strip heater receiving area are at opposite ends of said clip;
   said flange receiving area being generally U-shaped in configuration: said U-shaped configuration includes one side surface, an opposite side surface, and a connecting surface extending from said one side surface to said opposite side surface, said one side surface having a first end and a second end, said first end attached to said connecting surface and said second end attached to said strip heater receiving area, one side surface longer than said opposite side surface;
   said one side surface is non-parallel with said opposite side surface;
   said strip heater receiving area extending from said one side surface, said strip heater receiving area having two opposing sides and a base;
   one of said opposing sides is attached via material continuity to said one side surface;
   said one side surface is inclined inwardly at an angle of between 10 degrees to about 12 degrees with respect to said other side surface, reducing the flange receiving area, said flange receiving area including said opposing teeth comprising a combination of pointed and elongated teeth projections;
   said pointed and elongated teeth projections comprising a plurality of teeth on said one side surface and at least one tooth on said opposite side surface;
   said opposite side surface having two outer edges and an inner surface there between, wherein said elongated teeth being located on the inner surface; and
   at least one pointed tooth on said one side surface is aligned with another said tooth on said opposite side surface.

* * * * *